(12) United States Patent
Hirst (10) Patent No.: US 8,542,064 B2
(45) Date of Patent: Sep. 24, 2013

(54) METHODS AND APPARATUS TO CONTROL POWER IN A PRINTER

(75) Inventor: Barley Mark Hirst, Boise, ID (US)

(73) Assignee: Hewlett-Packard Development Company, L.P., Houston, TX (US)

(*) Notice: Subject to any disclaimer, the term of this patent is extended or adjusted under 35 U.S.C. 154(b) by 105 days.

(21) Appl. No.: 13/286,112

(22) Filed: Oct. 31, 2011

(65) Prior Publication Data

US 2013/0106189 A1 May 2, 2013

(51) Int. Cl.
*H03G 3/10* (2006.01)
*H03F 3/60* (2006.01)

(52) U.S. Cl.
USPC ............ 330/285; 330/310; 330/134; 330/311

(58) Field of Classification Search
USPC ................................. 330/285, 310, 134, 311
See application file for complete search history.

(56) References Cited

U.S. PATENT DOCUMENTS

| | | | |
|---|---|---|---|
| 5,621,299 A | 4/1997 | Krall | |
| 5,739,596 A | 4/1998 | Takizawa | |
| 6,246,214 B1 | 6/2001 | Oglesbee | |
| 6,861,824 B1 | 3/2005 | Liu | |
| 7,759,907 B2 | 7/2010 | Ferguson | |
| 2002/0021164 A1 | 2/2002 | Fugate | |
| 2003/0054703 A1 | 3/2003 | Fischer | |
| 2008/0068086 A1* | 3/2008 | Tsurumaki et al. | 330/277 |
| 2008/0201583 A1 | 8/2008 | Fujiwara | |
| 2009/0072906 A1* | 3/2009 | Tsurumaki et al. | 330/277 |
| 2009/0097181 A1 | 4/2009 | Tamegai | |
| 2010/0020598 A1* | 1/2010 | Wada et al. | 365/185.2 |
| 2011/0150522 A1* | 6/2011 | Hayasaki et al. | 399/88 |

OTHER PUBLICATIONS

Sherman; "Charge Your Battery Faster by Using a USB Port"; Power Electronics Technology; Jan. 2004; pp. 34-40.

* cited by examiner

*Primary Examiner* — Bao Q Vu (57) ABSTRACT

Methods and apparatus to control power in a printer are disclosed. An example apparatus includes a first field effect transistor having a first terminal, a second terminal, and a third terminal, the second terminal coupled with a first voltage input. The example apparatus further includes a second field effect transistor having a fourth terminal, a fifth terminal, and a sixth terminal, the fourth terminal coupled with the first terminal of the first field effect transistor, the fifth terminal coupled with a second voltage input. The example apparatus further includes a first comparator having a first input coupled to the first input voltage, having a second input coupled to the second input voltage, and having an output coupled with the third terminal.

12 Claims, 6 Drawing Sheets

FIG. 8 ing Date: November 13, 2023

METHODS AND APPARATUS TO CONTROL POWER IN A PRINTER

BACKGROUND

In printer control systems, power is conserved by entering a low power and/or sleep mode. While in the low power and/or sleep mode, printer power supplies are disabled, thereby consuming less power. When the printer power supplies are disabled, some devices within the printer that use power may lose power.

DETAILED DESCRIPTION

In printer control systems power is conserved by entering a low power and/or sleep mode. While in the low power and/or sleep mode, printer power supplies are disabled, thereby consuming less power. When the printer power supplies are disabled, some devices within the printer that use power while in the low power and/or sleep mode may lose power. For example, a USB memory device might use continuously supplied power, regardless of the low power and/or sleep mode. In examples disclosed herein, a printer power controller selects between two or more power supplies.

Present solutions use diodes (e.g., silicon diodes, Schottky diodes, etc.) as a "wired-OR" to supply voltage provided by one of the two or more power supplies having a higher voltage. However, significant amounts of power are dissipated by the diodes in such a configuration. For example, if 4 amperes are flowing through a silicon diode with a 0.7 volt drop, the diode dissipates 2.8 watts. When a Schottky diode is used instead, the voltage drop is reduced to 0.35 volt, thereby dissipating 1.4 watts. These power dissipation levels lead to large and/or expensive diodes and may additionally lead to heat-sinks and/or fans for forced cooling.

Examples illustrated herein use field effect transistors (FETs) with a low source to drain resistance (e.g., 10 milliohms) to significantly reduce power dissipation (e.g., to 160 milliwatts). By dissipating a smaller amount of power, operational costs (e.g., costs associated with power consumption of the device) as well as product costs can be lowered. In some examples, product costs are lowered by not requiring additional power dissipation devices such as, for example, heat-sinks, fans, etc.

In some examples, the FETs are configured to operate in a reverse conduction mode. When in the reverse conduction mode, no gate voltage is present, thereby allowing intrinsic parasitic body diodes of the FETs to function as a "wired-OR" circuit. The wired-OR circuit provides power to a converter until gate voltage can be generated.

When gate voltage is generated, a comparator controls the gates of the FETs to select an appropriate FET based on input voltage(s). The gates of the FETs are controlled to minimize conduction loss by short circuiting the parasitic body diodes. When the FET associated with the higher voltage supply is operating, the parasitic body diode of the FET associated with the lower voltage supply functions as a blocking diode thereby preventing reverse current flow from the higher voltage supply to the lower voltage supply.

Figure 1:
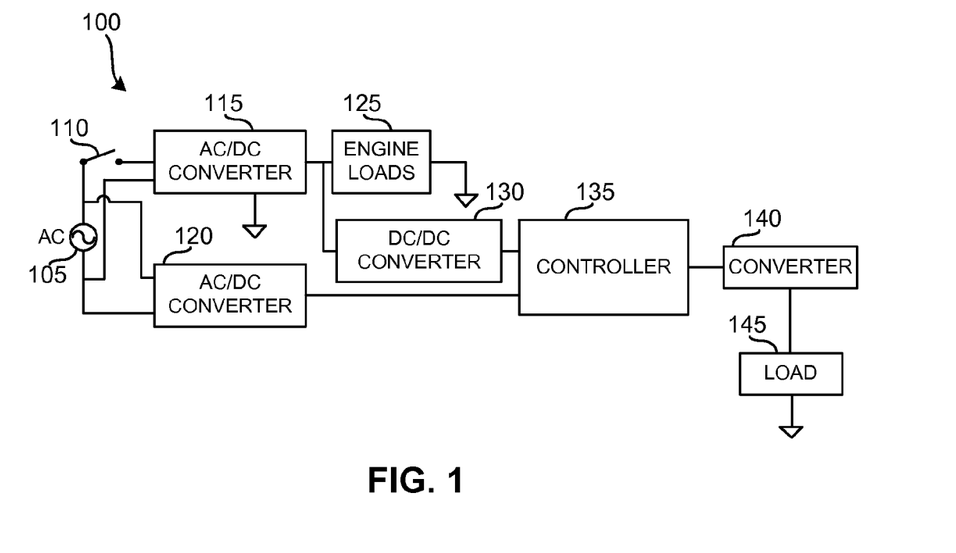
FIG. 1 is a block diagram of an example system constructed in accordance with the teachings of this disclosure for controlling power in a printer.

FIG. 1 is a block diagram of an example system 100 constructed in accordance with the teachings of this disclosure for controlling power in a printer. The example system 100 includes an alternating current (AC) power source 105, a sleep mode switch 110, a first AC/direct current (DC) converter 115, a second AC/DC converter 120, engine loads 125, a DC/DC converter 130, a controller 135, a converter 140, and a load 145.

The alternating current (AC) power source 105 of the illustrated example of FIG. 1 is a commercial power source. However, any power source may additionally or alternatively be used. For example, power may be provided via a non-commercial source such as, for example, a power generator and/or solar panels. The AC power source 105 of the illustrated example provides alternating current power at 120 volts and 60 Hertz. However, any other voltage, frequency, or power standard may additionally or alternatively be used. In the illustrated example, the AC power source 105 is a power source external to the printer. However, in some examples, the AC power source 105 is internal to the printer. For example, the AC power source 105 may be coupled to a transformer of the printer. In some examples, the transformer is internal to the printer, whereas in some other examples, the transformer is external to the printer (e.g., the transformer is enclosed in a wall dongle, a power brick, etc.)

The sleep mode switch 110 of the illustrated example of FIG. 1 is a switch that is opened and/or closed based on a low power and/or sleep state of the printer. The sleep mode switch 110 is coupled with the first AC/DC converter 115. When not in the low power and/or sleep state, the sleep mode switch 110 is closed, thereby providing AC power from the AC power source 105 to the first AC/DC converter 115. When in the low power and/or sleep state, the sleep mode switch 110 is opened and power is not provided to the first AC/DC converter 115.

The first AC/DC converter 115 of the illustrated example of FIG. 1 converts an input AC power into an output DC power. In the illustrated example, the first AC/DC converter 115 outputs a DC voltage sufficient to power the engine loads 125. In the illustrated example, the DC voltage is 24 volts. However, any other voltage may additionally or alternatively be used.

The engine loads 125 of the illustrated example of FIG. 1 are loads related to printing operations of the printer. In the illustrated example, the engine loads represent motors, fusers, and/or other devices for operating the printer. In the illustrated example, engine loads 125 are operated by the DC voltage of 24 volts supplied by the first AC/DC converter 115. However, in some examples the engine loads 125 may be operated by any other voltage such as, for example, an AC voltage, a DC voltage provided by a device other than the first AC/DC converter 115, etc.

The DC/DC converter 130 of the illustrated example of FIG. 1 converts the DC voltage provided by the first AC/DC converter 115 into a voltage that can be used by the load 145. In the illustrated example the DC/DC converter 130 accepts a DC input of 24 volts, and produces an output voltage of 5 volts. However, any other voltage may be received, and any other voltage may be output. In the illustrated example the output voltage of the DC/DC converter 130 is supplied as a first voltage input to the controller 135.

The second AC/DC converter 120 of the illustrated example of FIG. 1 converts the AC power provided by the AC power source 105 to a DC voltage. In the illustrated example, the DC voltage is 3.3 V. However in some examples, the DC voltage may be any other voltage. The DC voltage output by the second AC/DC converter 120 is provided as a second voltage input to the controller 135. In the illustrated example the second AC/DC converter 120 is not connected to the AC power source 105 via sleep mode switch 110. Thus, the second AC/DC converter 120 provides the DC output regardless of the low power and/or sleep state.

The controller 135 of the illustrated example of FIG. 1 selects between a first voltage input and a second voltage input, and provides the selected voltage input as an output to the converter 140. The controller 135 of the illustrated example is discussed in more detail in association with FIG. 2.

The converter 140 of the illustrated example of FIG. 1 converts the voltage output by the controller 135 to a voltage acceptable for use by the load 145. In the illustrated example, the converter 140 is a single-ended primary-inductor converter (SEPIC). However, any other type of converter may additionally or alternatively be used such as, for example, a flyback converter, a step-down converter, a step-up converter, etc.

The load 145 of the illustrated example of FIG. 1 is a load that uses power while the low power and/or sleep state is active. In the illustrated example, the load 145 is a hard disk drive within the printer. In such an example, corruption of the hard disk drive may occur if power is not provided to the hard disk drive. Additionally or alternatively, the load 145 may be any other type of device such as, for example a USB device, a network interface, a status display of the printer, etc.

Figure 2:
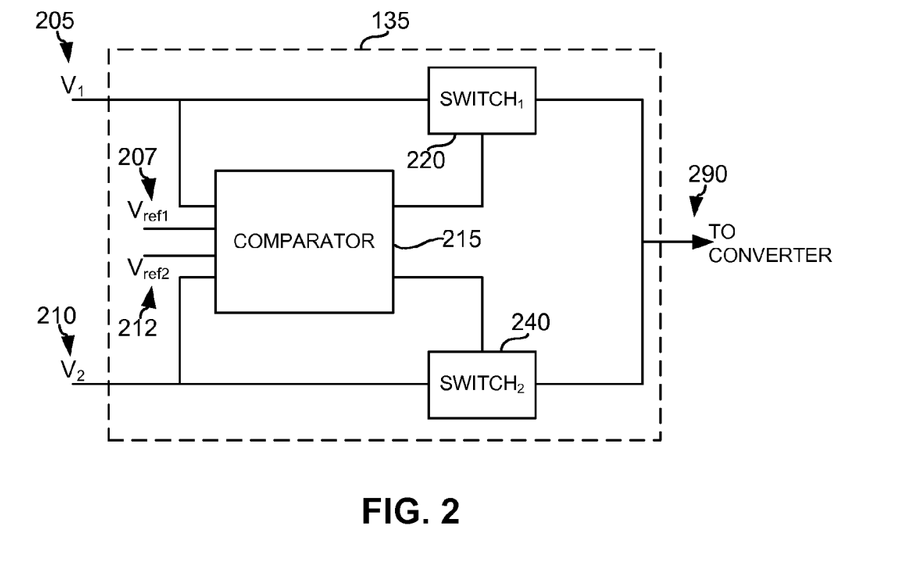
FIG. 2 is a block diagram of the example controller of FIG. 1.

FIG. 2 is a block diagram of the example controller 135 of FIG. 1. The example controller 135 of FIG. 2 includes a comparator 215, a first switch 220, and a second switch 240. In the illustrated example the controller 135 receives a first voltage input 205 and a second voltage input 210. Further, the controller 135 provides a voltage output 290 to the converter 140.

The controller 135 of the illustrated example generates a first reference voltage 207 and a second reference voltage 212. The first reference voltage 207 and the second reference voltage 212 are input to the comparator 215. In the illustrated example, the first reference voltage 207 and second reference voltage 212 are generated within the controller 135. However, in some examples, the first reference voltage 207 and the second reference voltage 212 are received as inputs to the controller 135. In the illustrated example, the first reference voltage 207 and the second reference voltage 212 are used by the comparator to define minimum voltage levels for the first and second voltages, respectively. When the voltage levels of the first and second voltages are above the first reference voltage 207 and the second reference voltage 212, respectively, the converter 140 may operate on either the first or second voltage.

The comparator 215 of the illustrated example of FIG. 2 is comprised of analog components such as, for example, resistors, capacitors, operational amplifiers, diodes, etc. However, in some examples, the comparator 215 includes digital components such as, for example a digital signal processor (DSP), and microprocessor, a field programmable gate array (FPGA), etc. in the illustrated example, the comparator 215 receives the first voltage input 205, the second voltage input 210, the first reference voltage 207, and the second reference voltage 212. The comparator 215 outputs a first control signal to the first switch 220 and a second control signal to the second switch 240.

The first switch 220 of the illustrated example of FIG. 2 is an electronic switching device. In the illustrated example, the first switch 220 is a field effect transistor (FET). However, any other type of electronic switching device may additionally or alternatively be used such as, for example, a transistor, a relay, solid-state relay, etc. In the illustrated example, the first switch 220 receives the first control signal from the comparator 215 and the first voltage input 205. Based on the first control signal, the first switch 220 passes the first voltage input 205 to the converter 140 as the voltage output 290.

The second switch 240 of the illustrated example of FIG. 2 is an electronic switching device. In the illustrated example, the second switch 240 is a field effect transistor (FET). However, any other type of electronic switching device may additionally or alternatively be used such as, for example, a transistor, a relay, solid-state relay, etc. In illustrated example, the second switch 240 receives the second control signal from the comparator 215 and the second voltage input 210. Based on the second control signal, the second switch 240 passes the second voltage input 210 to the converter 140 as the voltage output 290.

In the illustrated example, the first switch 220 and the second switch 240 are configured such that intrinsic parasitic body diodes of the first switch 220 and the second switch 240 are in a wired-OR configuration. These intrinsic parasitic body diodes function depending on a switch state. If both the first switch 220 and the second switch 240 are off (e.g., in an open state), they function as a "wired-OR". Thus, current passing through the diode of one switch will cause the diode of the other switch to become reverse-biased. For example, when both the first switch 220 and the second switch 240 are in an open state, current from one power supply (e.g., a power supply providing the first voltage input 205) cannot reach another power supply (e.g., a power supply providing the second voltage input 210).

Figure 3:
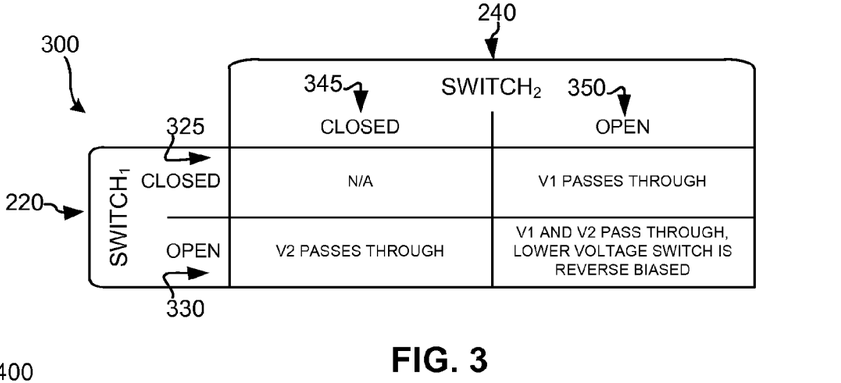
FIG. 3 is a diagram illustrating example states of the first switch and the second switch of the example controller of FIG. 2.

FIG. 3 is a diagram illustrating example states of the first switch 220 and the second switch 240 of the example controller 135 of FIG. 2. In illustrated example, each of the first switch 220 and the switch 240 each have two possible states. The first switch 220 may be in a closed state 325 or in an open state 330. The second switch 240 may be in a closed state 345 or in an open state 350.

In the illustrated example, the first switch 220 and the second switch 240 are not allowed to be closed simultaneously to prevent short circuiting the first voltage input 205 and the second voltage input 210. In this case, the intrinsic parasitic body diodes of the first switch 220 and the second switch 240 function as a wired-OR.

In the illustrated example, when the first switch 220 is in the open state 330 and the second switch 240 is in the closed state 350, the second voltage input 210 is passed through to the voltage output 290.

In the illustrated example, when the first switch 220 is in the closed state 325 and the second switch 240 is in the open state 345, the first voltage input 205 is passed through to the voltage output 290.

In the illustrated example, when the first switch 220 is in the open state 330 and the second switch 240 is in the open state 350, voltages from both the first voltage source and the second voltage source are passed through to the voltage output 290. Due to the wired-OR configuration described above, the respective diode of the first or second switch having a lower voltage will be reverse-biased by the opposite switch (i.e., the switch having a higher voltage), thereby preventing current flow from one voltage supply to another.

Figure 4:
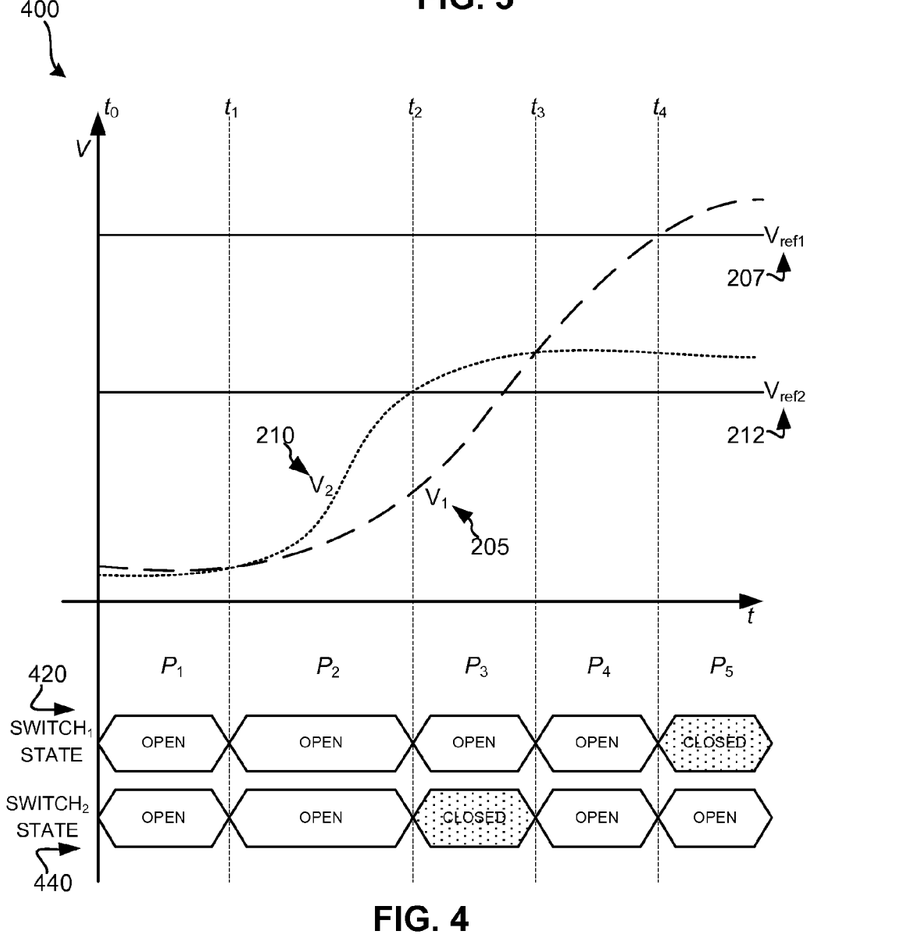
FIG. 4 is a timing diagram illustrating example states of the first switch and the second switch of the example controller of FIG. 2 based on input voltages.

FIG. 4 is a timing diagram 400 illustrating example states of the first switch 220 and the second switch 240 of the example controller 135 of FIG. 2 based on input voltages. The horizontal axis of the example timing diagram 400 represents time. The vertical axis of the example timing diagram 400 represents voltage, as well as a state of the first switch 420 and a state of the second switch 440.

The example timing diagram 400 includes the first voltage input 205, the second voltage input 210, the first reference voltage 207, and the second reference voltage 212. Further, the example timing diagram 400 identifies five instances of state change, shown by t0, t1, t2, t3, and t4. Further, the example timing diagram 400 identifies five periods between the five instances of state change.

The first period represents a time period between t0 and t1. Within the first period, the first voltage input 205 is greater than the second voltage input 210, however, both voltage inputs are lower than their associated reference voltages. Thus, the state of the first switch 420 is open, while the state of the second switch 440 is also open. Thus, by the wired-OR operation, the first voltage input 205 is passed through as the voltage output 290, as the diode of the second switch 240 is reverse-biased.

The second period represents a time period between t1 and t2. Within the second period, the second voltage input 210 is greater than the first voltage input 205. Again, both voltage inputs are lower than their associated reference voltages. Thus, the state of the first switch 420 is open, while the state of the second switch 440 is also open. Thus, by the wired-OR operation, the second voltage input 210 is passed through as the voltage output 290, as the diode of the first switch 220 is reverse-biased.

The third period represents a time period between t2 and t3. Within the third period, the second voltage input 210 is greater than the first voltage input 205. In the third period, the second voltage input 210 is greater than the second reference voltage 212. Thus, the state of the first switch 420 is open, while the state of the second switch 440 is closed. Thus, the second voltage input 210 is passed through as the voltage output 290.

The fourth period represents a time period between t3 and t4. Within the fourth period, the first voltage input 205 is greater than the second voltage input 210, but the first voltage input is less than the first reference voltage 207. In this example, the second voltage input 210 is greater than the second reference voltage 212. The state of the first switch 420 is open, while the state of the second switch 440 is also open. Thus, by the wired-OR operation, the first voltage input 205 is passed through as the voltage output 290, as the diode of the second switch 240 is reverse-biased.

The fifth period represents a time period after t4. Within the fifth period, the first voltage input 205 is greater than the first reference voltage 207. The state of the first switch 420 is closed and the state of the second switch 440 is open. Thus, the first voltage input 205 is passed through as the voltage output 290.

Figure 5:
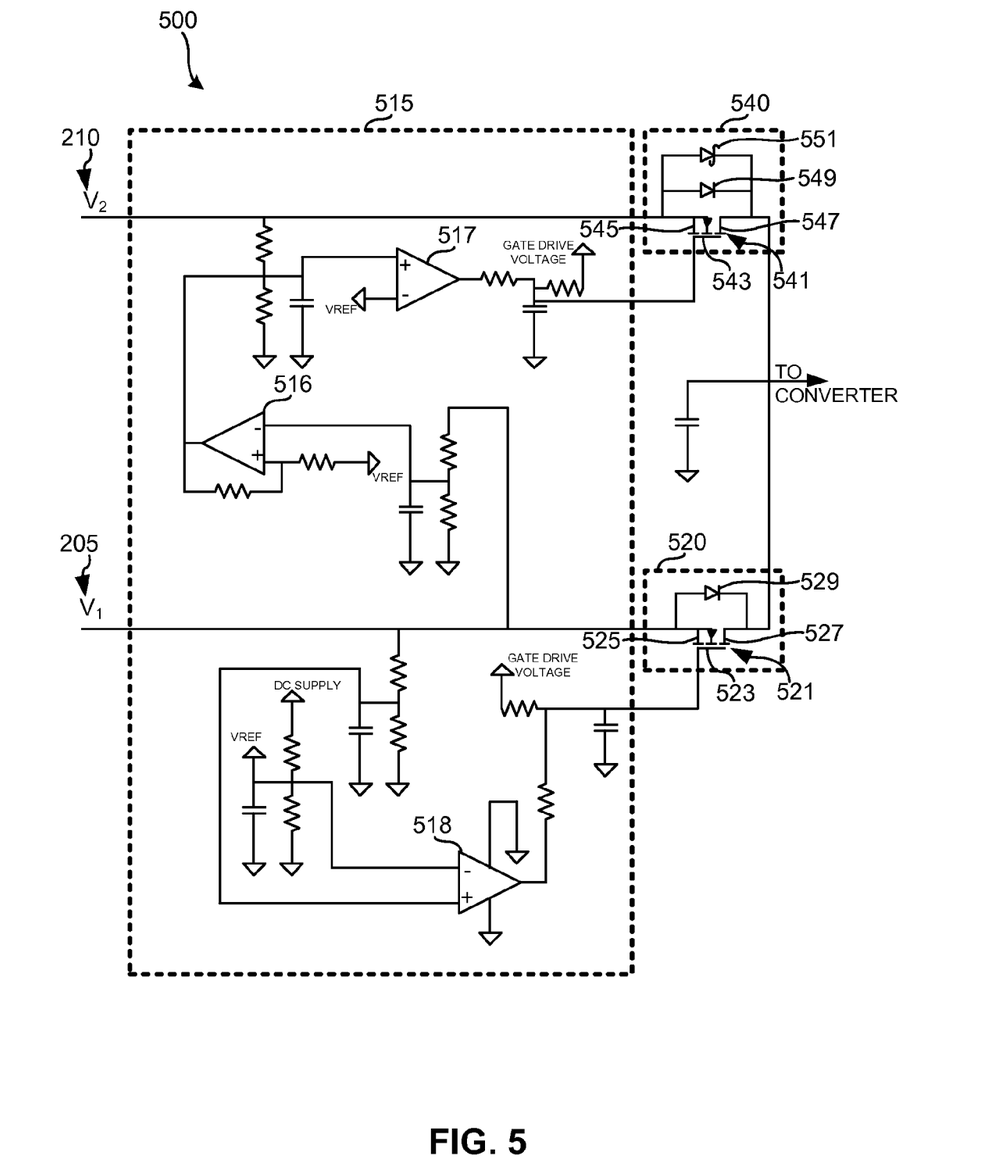
FIG. 5 is a schematic diagram of an example circuit illustrating the example controller of FIG. 2 using N-type field effect transistors.

FIG. 5 is a schematic diagram of an example circuit 500 illustrating the example controller 135 of FIG. 2 using N-type field effect transistors. In the illustrated example, the comparator 215 is represented as block 515, the first switch 220 is represented as block 520, and the second switch 240 is represented as block 540. The comparator 515 includes discrete components such as, for example, resistors and capacitors. Further, the comparator 515 of the illustrated example of FIG. 5 includes three comparators 516, 517, and 518.

The first switch 520 includes a first N-type field effect transistor (FET) 521. The first FET 521 has a first terminal 523, a second terminal 525, and a third terminal 527. In the illustrated example, the first terminal 523 is a gate, the second terminal 525 is a source, and the third terminal 527 is a drain. Further, the first switch 520 includes a diode 529. In the illustrated example, the diode 529 is an intrinsic parasitic component of the FET 521. However, in some examples, the diode 529 is a separate discrete component. In the illustrated example, the diode 529 prevents reverse current flow from the second voltage input 210 towards the first voltage input 205 via the first switch 520 when the first switch 520 is open. The diode 529 of the illustrated example includes a cathode.

The second switch 540 includes a second N-type FET 541. The second FET 541 has a fourth terminal 523, a fifth terminal 545, and a sixth terminal 547. In the illustrated example, the fourth terminal 543 is a gate, the fifth terminal 545 is a source, and the sixth terminal 547 is a drain. Further, the second switch 520 includes a diode 549. As with the first switch 520, the diode 549 of the illustrated example is an intrinsic component of the second FET 541. However, in some examples, the diode 549 is a separate discrete component. Further, the second switch 540 of the illustrated example includes a Schottky diode 551. The diode 549 and/or the Schottky diode 551 prevents reverse current flow from the first voltage input 205 towards the second voltage input 210 via the second switch 540 when the second switch 540 is open. The diode 549 of the illustrated example includes a cathode communicatively coupled with the cathode of the diode 529. Further, the cathode of the diode 549 and the cathode of the diode 529 are communicatively coupled to the converter 140.

The diode 529 and the diode 549 interact to prevent current from one power supply from reaching another supply. For example, when current is flowing from the DC/DC converter 130 towards the converter 140, the diode 549 prevents current from flowing to the AC/DC converter 120 when the switch 540 is open.

As described above, the comparator 515 includes a first comparator 516, a second comparator 517, and a third comparator 518. In the illustrated example, the first comparator 516, the second comparator 517, and the third comparator 518 are open-collector type comparators.

The first comparator 516 of the illustrated example has a first input coupled to the first voltage input 205 and a second input coupled to the reference voltage 212. Further, the first comparator 516 of the illustrated example has an output coupled with the fourth terminal 543 (i.e., the gate terminal of the second FET 541). The output of the first comparator 516 is an open collector output that is coupled to the second voltage input through a voltage division network. In the illustrated example, the output of the first comparator 516 is coupled to the fourth terminal 543 via the second comparator 517. Thus, when the first voltage input 205 exceeds a threshold, the comparator 516 relays a signal to the second comparator 517 causing the second comparator to turn off the switch 540.

The second comparator 517 of the illustrated example has a first input coupled with the output of the first comparator 516, and a second input coupled with the second reference voltage. The output of the second comparator 517 is coupled with the fourth terminal 543 (i.e., the gate terminal of the second FET 541).

The third comparator 518 of the illustrated example has a first input coupled with the first voltage input 205, and a second input coupled with the first reference voltage. The output of the third comparator 518 is coupled with the first terminal 523 (i.e., the gate terminal of the first FET 521).

In the illustrated example, the N-type FETs 521 and 541 of FIG. 5 operate in a reverse conduction mode. For example, in the example shown in FIG. 5, current flows from source to drain rather than drain to source. Thus, the FETs 521 and 541 are bi-directional current switches once gate voltage is generated. When the FETs 521 and 541 are operated in reverse conduction mode, current flow effectively bypasses the diodes 529, 549, and 551 when gate voltage is present; and the FETs 521 and 541 operate in wired-OR when gate voltage is not present. This allows the circuit 500 to provide power to the converter 140 even while the inputs 210 and 205 are ramping up.

Figure 6:
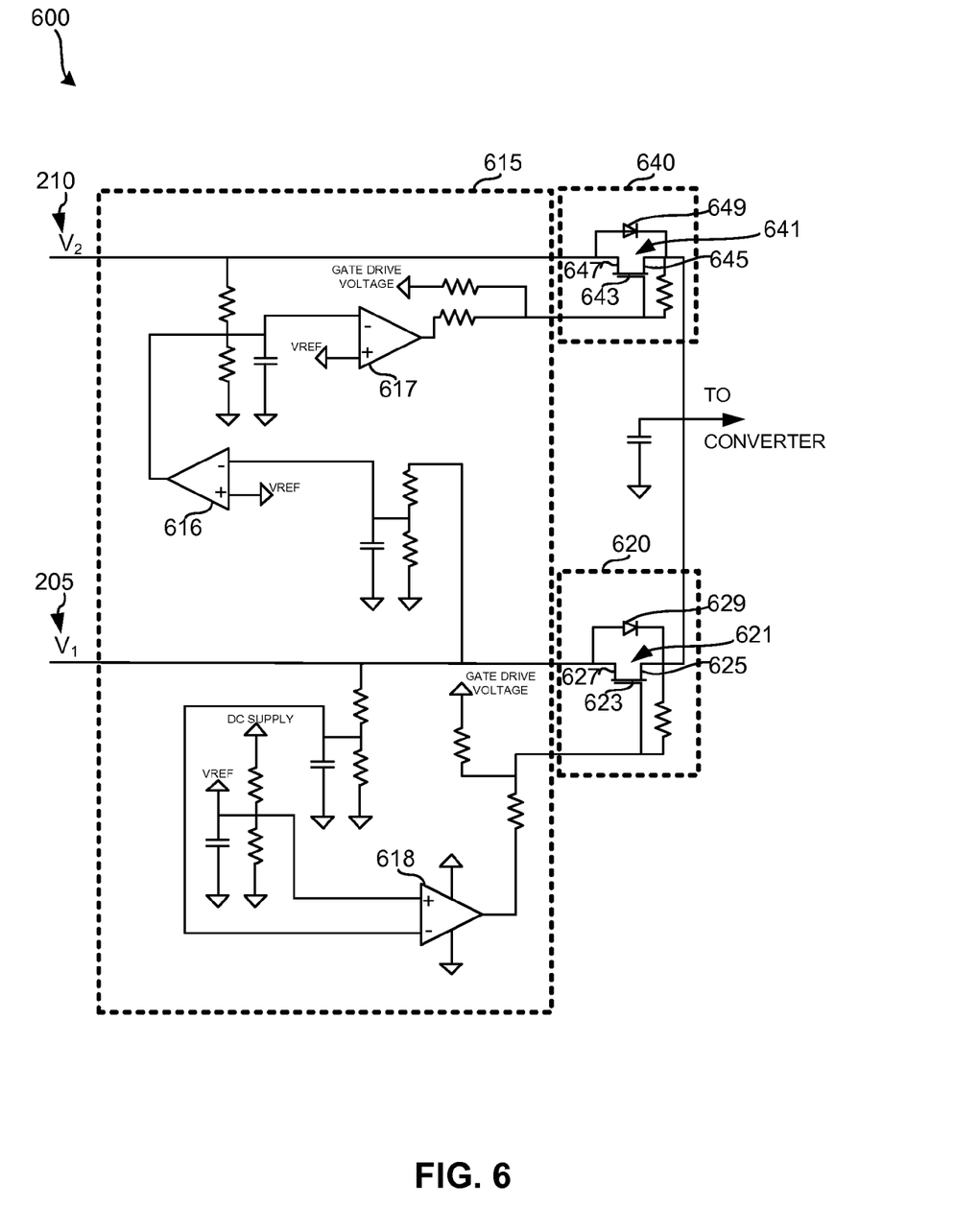
FIG. 6 is a schematic diagram of an example circuit illustrating the example controller of FIG. 2 using P-type field effect transistors.

FIG. 6 is a schematic diagram of an example circuit 600 illustrating the example controller 135 of FIG. 2 using P-type field effect transistors. In the illustrated example, the comparator 215 is represented as block 615, the first switch 220 is represented as block 620, and the second switch 240 is represented as block 640. The comparator 615 includes discrete components such as, for example, resistors and capacitors. Further, the comparator 615 of the illustrated example of FIG. 6 includes three comparators 616, 617, and 618.

The first switch 620 includes a first P-type field effect transistor (FET) 621. The first FET 621 has a first terminal 623, a second terminal 625, and a third terminal 627. In the illustrated example, the first terminal 623 is a gate, the second terminal 625 is a source, and the third terminal 627 is a drain. Further, the first switch 620 includes a diode 629. In the illustrated example, the diode 629 is an intrinsic parasitic component of the FET 621. However, in some examples, the diode 629 is a separate discrete component. In the illustrated example, the diode 629 prevents reverse current flow from the second voltage input 210 towards the first voltage input 205 via the first switch 620. The diode 529 of the illustrated example includes a cathode.

The second switch 640 includes a second P-type FET 641. The second FET 641 has a fourth terminal 643, a fifth terminal 645, and a sixth terminal 647. In the illustrated example, the fourth terminal 643 is a gate, the fifth terminal 645 is a source, and the sixth terminal 647 is a drain. Further, the second switch 620 includes a diode 649. As with the first switch 620, the diode 649 of the illustrated example is an intrinsic component of the second FET 641. However, in some examples, the diode 649 is a separate discrete component. The diode 649 prevents reverse current flow from the first voltage input 205 towards the second voltage input 210 via the second switch 640. The diode 649 of the illustrated example includes a cathode communicatively coupled with the cathode of the diode 629. Further, the cathode of the diode 649 and the cathode of the diode 629 are communicatively coupled to the converter 140.

The diode 629 and the diode 649 interact to prevent current from one power supply from reaching another supply. For example, when current is flowing from the DC/DC converter 130 to the converter 140, the diode 549 prevents current from flowing to the AC/DC converter 120.

As described above, the comparator 615 includes a first comparator 616, a second comparator 617, and a third comparator 618. In the illustrated example, the first comparator 616, the second comparator 617, and the third comparator 618 are open-collector type comparators.

The first comparator 616 of the illustrated example has a first input coupled to the first voltage input 205 and a second input coupled to the a reference voltage (e.g., the reference voltage 212). Further, the first comparator 616 of the illustrated example has an output coupled with the fourth terminal 643 (i.e., the gate terminal of the second FET 641). In the illustrated example, the output of the first comparator 616 is coupled to the fourth terminal 643 via the second comparator 617.

The second comparator 617 of the illustrated example has a first input coupled with the output of the first comparator 616, and a second input coupled with the second reference voltage 212. The output of the second comparator 617 is coupled with the fourth terminal 643 (i.e., the gate terminal of the second FET 641).

The third comparator 618 of the illustrated example has a first input coupled with the first voltage input 205, and a second input coupled with the first reference voltage 207. The output of the third comparator 618 is coupled with the first terminal 623 (i.e., the gate terminal of the first FET 621).

In the illustrated example, the P-type FETs 621 and 641 of FIG. 6 operate in a reverse conduction mode. For example, in the example shown in FIG. 6, current flows from drain to source rather than source to drain. Thus, the FETs 621 and 641 are bi-directional current switches once gate voltage is generated. When the FETs 621 and 641 are operated in the reverse conduction mode, current flow effectively bypasses the diodes 629, and 649 when gate voltage is present; and the FETs 6 and 641 operate in wired-OR when gate voltage is not present. This allows the circuit 600 to provide power to the converter 140 even while the inputs 210 and 205 are ramping up.

While an example manner of implementing the controller 135 of FIGS. 1 and 2 has been illustrated in FIGS. 5 and 6, one or more of the elements, processes and/or devices illustrated in FIG. 4 may be combined, divided, re-arranged, omitted, eliminated and/or implemented in any other way. Further, the example comparator 215, the example first switch 220, the example second switch 240 and/or more generally, the example controller 135 of FIGS. 1 and 2 may be implemented by hardware, software, firmware and/or any combination of hardware, software and/or firmware. Thus, for example, any of the example comparator 215, the example first switch 220, the example second switch 240, and/or, more generally, the example controller 135 of FIGS. 1 and 2 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended apparatus claims are read to cover a purely software and/or firmware implementation, at least one of the example comparator 215, the example first switch 220, and/or the example second switch 240 are hereby expressly defined to include a machine-readable medium such as a memory (e.g., an Erasable Programmable Read-Only Memory (EPROM), Electrically Erasable Programmable Read-Only Memory (EPROM), flash memory, etc.), DVD, CD, etc. storing the software and/or firmware. Further still, the example controller 135 of FIGS. 1 and 2 may include one or more elements, processes and/or devices in addition to, or instead of, those illustrated in FIG. 2, and/or may include more than one of any or all of the illustrated elements, processes and devices.

Figure 7:
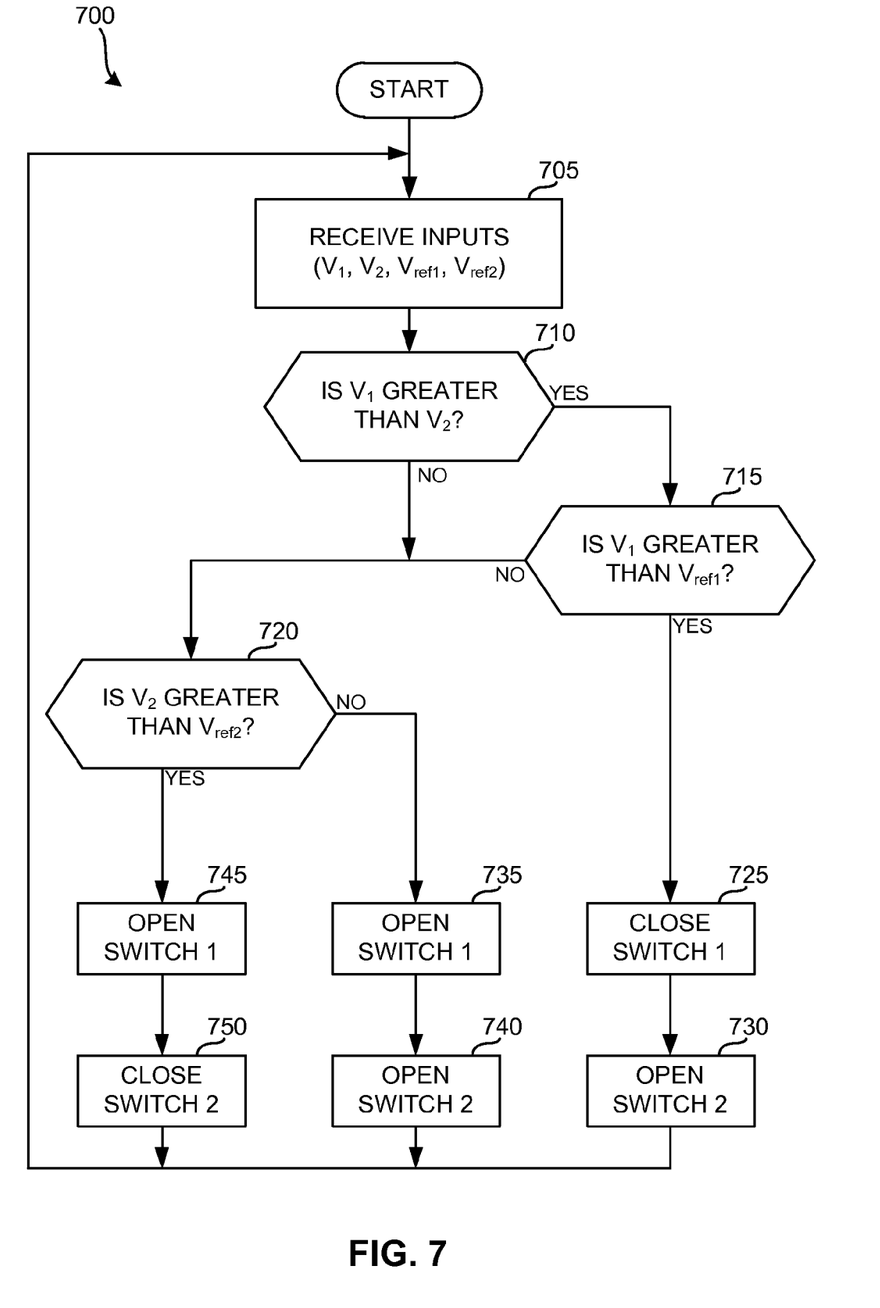
FIG. 7 is a flowchart representative of example machine-readable instructions that may be executed to implement the example comparator of FIG. 2.

A flowchart representative of an example process for implementing the comparator 215 of FIG. 2 is shown in FIG. 7. The example process of FIG. 7 may be implemented using machine-readable instructions and may comprise a program for execution by a processor such as the processor 812 shown in the example processor platform 800 discussed below in connection with FIG. 8. The program may be embodied in software stored on a machine-readable medium such as a CD-ROM, a floppy disk, a hard drive, a digital versatile disk (DVD), or a memory associated with the processor 812, but the entire program and/or parts thereof could alternatively be executed by a device other than the processor 812 and/or embodied in firmware or dedicated hardware. Further, although the example program is described with reference to the flowchart illustrated in FIG. 7, many other methods of implementing the example comparator 215 may alternatively be used. For example, the order of execution of the blocks may be changed, and/or some of the blocks described may be changed, eliminated, or combined.

As mentioned above, the example process of FIG. 7 may be implemented using coded instructions (e.g., machine-readable instructions) stored on a tangible machine-readable medium such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible machine-readable medium is expressly defined to include any type of machine-readable storage and to exclude propagating signals. Additionally or alternatively, the example process of FIG. 7 may be implemented using coded instructions (e.g., machine-readable instructions) stored on a non-transitory machine-readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory machine-readable medium is expressly defined to include any type of machine-readable medium and to exclude propagating signals.

FIG. 7 is a flowchart 700 representative of an example process that may be executed to implement the example comparator 215 of FIG. 2. The example process of FIG. 7 begins when the comparator 215 receives the first voltage input 205, the second voltage input 210, the first reference voltage 207, and the second reference voltage 212 (block 705.) In some examples, the comparator 215 receives the first voltage input 205, the second voltage input 210 and derives the first reference voltage 207 and the second reference voltage 212 from a single reference voltage. The comparator 215 then determines whether the first voltage 205 is greater than the second voltage 210 (block 710.) If the first voltage 205 is greater than the second voltage 210 the comparator 215 determines whether the first voltage 205 is greater than the first reference voltage 207 (block 715.) If the first voltage 205 is greater than the first reference voltage 207, the comparator 215 closes the first switch 220 (block 725,) and opens the second switch 240 (block 730.)

If the first voltage 205 is less than the second voltage 210 or the first voltage 205 is greater than the second voltage 210 but less than the first reference voltage 207, the comparator 215 determines whether the second voltage 210 is greater than the second reference voltage 212 (block 720.) If the second voltage is greater than the second reference voltage, the comparator opens the first switch 220 (block 745,) and closes the second switch 240 (block 750.) If the second voltage 210 is less than the second reference voltage 212 the comparator 215 opens the first switch 220 (block 735,) and opens the second switch 240 (block 740.)

Figure 8:
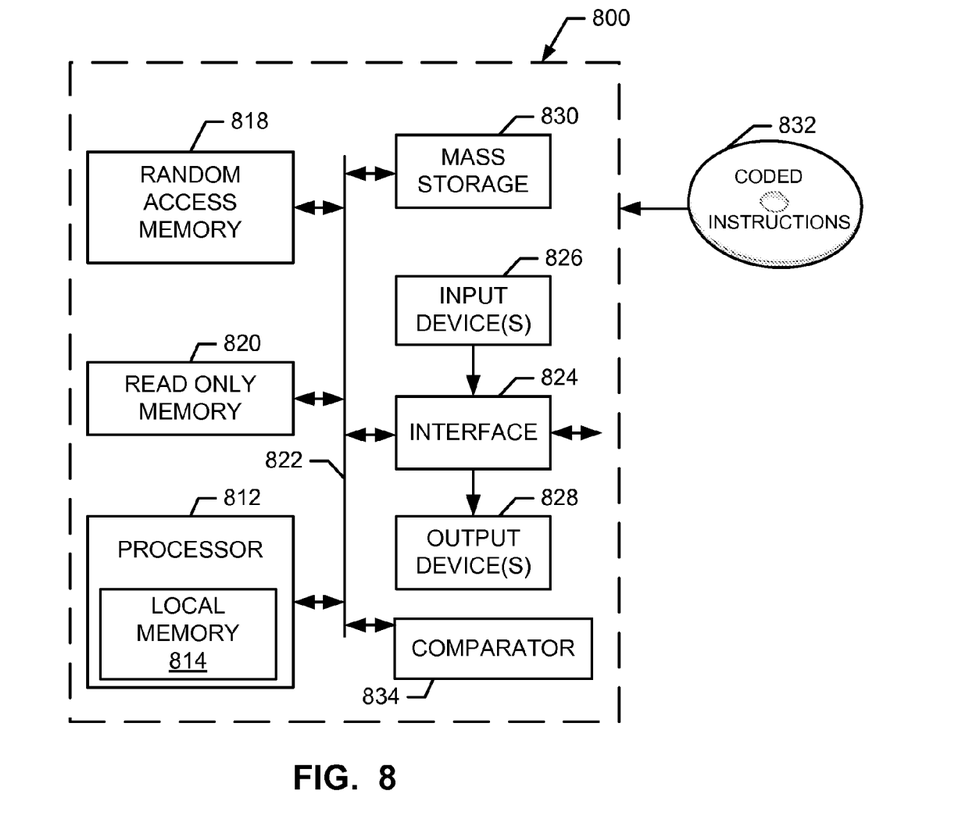
FIG. 8 is a block diagram of an example processor platform that may execute, for example, the machine-readable instructions of FIG. 7 to implement the example comparator of FIG. 2.

FIG. 8 is a block diagram of an example processor platform 800 capable of executing the instructions of FIG. 7 to implement the example comparator 215 of FIG. 2. The example processor platform 800 can be, for example, a printer, a microcontroller, a digital signal processor (DSP), or any other type of computing and/or processing device.

The system 800 of the instant example includes a processor 812. For example, the processor 812 can be implemented by one or more Intel® microprocessors from the Pentium® family, the Itanium® family or the XScale® family. Of course, other processors from other families are also appropriate.

The processor 812 is in communication with a main memory 814 including a volatile memory 818 and a non-volatile memory 820 via a bus 822. The volatile memory 818 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 820 may be implemented by flash memory and/or any other desired type of memory device. Access to the main memory 814 is typically controlled by a memory controller (not shown).

The example processor platform 800 also includes an interface circuit 824. The interface circuit 824 may be implemented by any type of interface standard, such as an Ethernet interface, a universal serial bus (USB), and/or a PCI express interface.

One or more input devices 822 are connected to the interface circuit 824. The input device(s) 826 permit a user to enter data and commands into the processor 812. The input device(s) can be implemented by, for example, a serial port, an analog to digital converter, a parallel port, etc.

One or more output devices 828 are also connected to the interface circuit 824. The output devices 828 can be implemented, for example, by a serial port, a parallel port, a digital to analog converter, etc.

The example processor platform 800 also includes one or more mass storage devices 830 for storing software and/or data. Examples of such mass storage devices 830 include floppy disk drives, hard drive disks, compact disk drives and digital versatile disk (DVD) drives.

The coded instructions of FIG. 7 may be stored in the mass storage device 830, in the volatile memory 818, in the non-volatile memory 820, and/or on a removable storage medium 832 such as a CD or DVD.

The example processor platform 800 also includes a comparator 834. The comparator 834 receives inputs from the input devices 826 such as, for example, analog and/or digital representations of one or voltages and/or reference voltages. The comparator 834 compares the received inputs and outputs one or more control signals via the output devices 828.

From the foregoing, it will be appreciated that the above disclosed methods, apparatus, and articles of manufacture reduce power dissipation losses in printer power control circuitry.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. A circuit to control power in a printer, the circuit comprising:
a first field effect transistor having a first terminal, a second terminal, and a third terminal, the second terminal coupled with a first voltage input;
a second field effect transistor having a fourth terminal, a fifth terminal, and a sixth terminal, the fourth terminal coupled with the first terminal of the first field effect transistor, the fifth terminal coupled with a second voltage input; and
a first comparator having a first input coupled to the first input voltage, the first comparator having a second input coupled to the second input voltage, and the first comparator having a first output coupled with the third terminal via a second comparator, the second comparator having: (1) a third input coupled to a first reference voltage, (2) a fourth input coupled to the output of the first comparator, and (3) an output coupled with the third terminal.

2. The circuit as described in claim 1, further comprising a third comparator having: (1) a fifth input coupled to a second reference voltage, (2) a sixth input coupled to the second input voltage, and (3) a third output coupled with the sixth terminal.

3. A circuit to control power in a printer, the circuit comprising:
a first field effect transistor having a first terminal, a second terminal, and a third terminal, the second terminal coupled with a first voltage input;
a second field effect transistor having a fourth terminal, a fifth terminal, and a sixth terminal, the fourth terminal coupled with the first terminal of the first field effect transistor, the fifth terminal coupled with a second voltage input;
a first comparator having a first input coupled to the first input voltage, the first comparator having a second input coupled to the second input voltage, and the first comparator having a first output coupled with the third terminal;
the first field effect transistor is an n-type field effect transistor;
the first terminal is a gate terminal;
the second terminal is a source terminal;
the third terminal is a drain terminal;
the second field effect transistor is an n-type field effect transistor;
the fourth terminal is a gate terminal;
the fifth terminal is a source terminal; and
the sixth terminal is a drain terminal.

4. A circuit to control power in a printer, the circuit comprising:
a first field effect transistor having a first terminal, a second terminal, and a third terminal, the second terminal coupled with a first voltage input;
a second field effect transistor having a fourth terminal, a fifth terminal, and a sixth terminal, the fourth terminal coupled with the first terminal of the first field effect transistor, the fifth terminal coupled with a second voltage input;
a first comparator having a first input coupled to the first input voltage, the first comparator having a second input coupled to the second input voltage, and the first comparator having a first output coupled with the third terminal;
the first field effect transistor is a p-type field effect transistor;
the first terminal is a gate terminal;
the second terminal is a source terminal;
the third terminal is a drain terminal;
the second field effect transistor is a p-type field effect transistor;
the fourth terminal is a gate terminal;
the fifth terminal is a source terminal; and
the sixth terminal is a drain terminal.

5. A circuit to control power in a printer, the circuit comprising:
a first field effect transistor having a first terminal, a second terminal, and a third terminal, the second terminal coupled with a first voltage input;
a second field effect transistor having a fourth terminal, a fifth terminal, and a sixth terminal, the fourth terminal coupled with the first terminal of the first field effect transistor, the fifth terminal coupled with a second voltage input, the first field effect transistor and the second field effect transistor being arranged in a wired-OR configuration; and
a first comparator having a first input coupled to the first input voltage, the first comparator having a second input coupled to the second input voltage, and the first comparator having a first output coupled with the third terminal.

6. An apparatus to control power in a printer, the apparatus comprising:
a comparator to receive a first voltage from a first power supply of a printer and a second voltage from a second power supply of the printer, the comparator to output a first control signal and a second control signal, the comparator to output the first control signal when the first voltage is greater than the second voltage and the first voltage is greater than a first reference voltage, the comparator to output the second control signal when the second voltage is greater than the first voltage and the second voltage is greater than a second reference voltage;
a first switch to receive the first voltage and output a first output voltage to a power converter of the printer based on the first control signal, the first switch having a first intrinsic diode; and
a second switch to receive the second voltage and to output a second output voltage to the converter based on the second control signal, the second switch having a second intrinsic diode, a first cathode of the first intrinsic diode being communicatively coupled with a second cathode of the second intrinsic diode and the power converter.

7. An apparatus to control power in a printer, the apparatus comprising:
a comparator to receive a first voltage from a first power supply of a printer and a second voltage from a second power supply of the printer, the comparator to output a first control signal and a second control signal;
a first switch to receive the first voltage and output a first output voltage to a power converter of the printer based on the first control signal, the first switch having a first intrinsic diode, the first intrinsic diode to prevent a current from the second power supply from being passed to the first power supply; and
a second switch to receive the second voltage and to output a second output voltage to the converter based on the second control signal, the second switch having a second intrinsic diode, a first cathode of the first intrinsic diode being communicatively coupled with a second cathode of the second intrinsic diode and the power converter.

8. An apparatus to control power in a printer, the apparatus comprising:
a comparator to receive a first voltage from a first power supply of a printer and a second voltage from a second power supply of the printer, the comparator to output a first control signal and a second control signal;
a first switch to receive the first voltage and output a first output voltage to a power converter of the printer based on the first control signal, the first switch having a first intrinsic diode, the power converter of the printer to output power to a load of the printer regardless of a low power state of the printer; and
a second switch to receive the second voltage and to output a second output voltage to the converter based on the second control signal, the second switch having a second intrinsic diode, a first cathode of the first intrinsic diode being communicatively coupled with a second cathode of the second intrinsic diode and the power converter.

9. The apparatus as described in claim 8, wherein the first power supply is disabled when the printer is in the low power state.

10. An apparatus to control power in a printer, the apparatus comprising:
a comparator to receive a first voltage from a first power supply of a printer and a second voltage from a second power supply of the printer, the comparator to output a first control signal and a second control signal;
a first switch to receive the first voltage and output a first output voltage to a power converter of the printer based on the first control signal, the first switch having a first intrinsic diode, the first switch being a field effect transistor configured in a reverse conduction mode; and
a second switch to receive the second voltage and to output a second output voltage to the converter based on the second control signal, the second switch having a second intrinsic diode, a first cathode of the first intrinsic diode being communicatively coupled with a second cathode of the second intrinsic diode and the power converter.

11. An apparatus to control power in a printer, the apparatus comprising:
a comparator to receive a first voltage from a first power supply of a printer and a second voltage from a second power supply of the printer, the comparator to output a first control signal and a second control signal;
a first switch to receive the first voltage and output a first output voltage to a power converter of the printer based on the first control signal, the first switch having a first intrinsic diode, the first intrinsic diode being a parasitic body diode: and
a second switch to receive the second voltage and to output a second output voltage to the converter based on the second control signal, the second switch having a second intrinsic diode, a first cathode of the first intrinsic diode being communicatively coupled with a second cathode of the second intrinsic diode and the power converter.

12. An apparatus to control power in a printer, the apparatus comprising:
a comparator to receive a first voltage from a first power supply of a printer and a second voltage from a second power supply of the printer, the comparator to output a first control signal and a second control signal;
a first switch to receive the first voltage and output a first output voltage to a power converter of the printer based on the first control signal, the first switch having a first intrinsic diode; and
a second switch to receive the second voltage and to output a second output voltage to the converter based on the second control signal, the second switch having a second intrinsic diode, a first cathode of the first intrinsic diode being communicatively coupled with a second cathode of the second intrinsic diode and the power converter, the first intrinsic diode and the second intrinsic diode to function as a wired-OR by providing power to the power converter of the printer until the at least one of the first control signal and the second control signal are generated.

* * * * *

UNITED STATES PATENT AND TRADEMARK OFFICE
CERTIFICATE OF CORRECTION

PATENT NO. : 8,542,064 B2  
APPLICATION NO. : 13/286112  
DATED : September 24, 2013  
INVENTOR(S) : Bartley Mark Hirst Page 1 of 1

It is certified that error appears in the above-identified patent and that said Letters Patent is hereby corrected as shown below:

On the title page, in item (75), Inventors, in column 1, line 1,
delete "Barley" and insert -- Bartley --, therefor.

Signed and Sealed this
Third Day of December, 2013

Margaret A. Focarino
*Commissioner for Patents of the United States Patent and Trademark Office*